United States Patent
Chrabieh (10) Patent No.: US 9,813,877 B1
(45) Date of Patent: Nov. 7, 2017

(54) ACCURATE INDOOR POSITIONING WITH CELLULAR SIGNALS

(71) Applicant: Rabih Chrabieh, Paris (FR)

(72) Inventor: Rabih Chrabieh, Paris (FR)

(73) Assignee: Nestwave SAS, Paris (FR)

(*) Notice: Subject to any disclaimer, the term of this patent is extended or adjusted under 35 U.S.C. 154(b) by 36 days.

(21) Appl. No.: 14/968,880

(22) Filed: Dec. 14, 2015

(51) Int. Cl.
*H04W 4/04* (2009.01)
*H04W 56/00* (2009.01)
*H04W 64/00* (2009.01)

(52) U.S. Cl.
CPC ......... *H04W 4/043* (2013.01); *H04W 56/001* (2013.01); *H04W 64/00* (2013.01)

(58) Field of Classification Search
CPC ....... H04W 64/00; H04W 4/02; H04W 4/043; H04W 4/04
See application file for complete search history.

(56) References Cited

U.S. PATENT DOCUMENTS

| 2004/0102196 A1* | 5/2004 | Weckstrom ........... H04W 64/00 455/456.1 |
| 2009/0143018 A1* | 6/2009 | Anderson ............... G01S 5/021 455/67.11 |
| 2016/0223641 A1* | 8/2016 | Cheng ................... G01S 5/0036 |

* cited by examiner

*Primary Examiner* — Nam Huynh
(74) *Attorney, Agent, or Firm* — Lumen Patent Firm (57) ABSTRACT

A system for accurate positioning of a communication devices includes a plurality of positioning cells configured for synchronizing to the cellular network and to each other, and for emitting positioning signals during time intervals proximal to time points at which the cellular network emits synchronization signals. In the manner, the positioning signals reach the communication device when the communication device's antenna is on for listening to a synchronization signal of the cellular network. Processing the times of arrival of the positioning signals by a server in communication with the communication device enables accurate positioning of the communication device.

19 Claims, 4 Drawing Sheets

ACCURATE INDOOR POSITIONING WITH CELLULAR SIGNALS

TECHNICAL FIELD

The present invention, in some embodiments thereof, relates to techniques for locating a user indoor by using electromagnetic waves.

BACKGROUND OF THE INVENTION

Accurately locating a user indoor, e.g. in a shop, has a number of applications. Most solutions today use Bluetooth, WiFi, UWB (Ultra-WideBand), cameras or motion sensors. But all of these solutions have drawbacks and typical accuracy is above 5 m.

BRIEF SUMMARY OF EMBODIMENTS OF THE INVENTION

The inventor has found that use of cellular technology for positioning may be advantageous as the cellular network is always on, has low power consumption, and can be operator controlled. However, there exists no reliably accurate indoor cellular positioning solution.

In some embodiments of the present invention, the (3G or 4G) cellular Observed Time Difference Of Arrival (OT-DOA) positioning is augmented by increasing the number of cellular sites, by adding additional positioning cells. Positioning cells are special beacons that automatically learn the identities and synchronization of the cellular network around them, automatically configure themselves (with help from network), and then transmit positioning pilots only during time intervals when cellular phones listen for synchronization signal (i.e., positioning pilots) from the cellular network, without interfering with the network.

The connection between the positioning cells of the present application and the cellular network may be direct, or mediated by a communication device (e.g., a cellular phone) that is connected to the cellular network. Communication between the positioning cells and a communication device used by a user to display the user's position may be in the spectrum of the cellular network or in an unlicensed spectrum, such as WiFi or Bluetooth, for example.

Therefore an aspect of some embodiments of the present invention relates to a positioning system configured for being used in conjunction with a server and a communication device synchronized with a cellular network, the positioning system comprises a plurality of positioning cells. Each positioning cell comprising an antenna unit configured for emitting and receiving radio-frequency signals, and being associated with a non-volatile memory unit configured for storing data, a processing unit configured for processing data and for controlling an operation of the antenna unit, and a power source configured for powering the antenna unit. At least one of the positioning cells is connected to a cellular network, and the positioning cells are configured for emitting respective positioning signals (i.e., positioning pilots) receivable by the communication device in a frequency used by the cellular network, in response to the reception of a synchronization signal emitted by the cellular network, each positioning signal comprising data indicative of an identifier of the positioning cell that emitted the positioning signal. The server is in communication with the communication device, the server being configured for: (i) receiving from the communication device first data indicative of times of arrival of the positioning signals to the communication device, each piece of data indicative of a time of arrival being appended with an identifier of the associated positioning cell; (ii) processing the times of arrival and using known positions of the positioning cells to determine a position of communication device with respect to the positioning cells; and (iii) sending to the communication device second data indicative of the position.

Optionally, the positioning cells are associated with respective physical cell identifications (PCIs) but do not have a global cell identification in the cellular network.

Optionally, the server is configured for determining the position of communication device via triangulation.

Optionally, the positioning signals do not interfere with the cellular network, the positioning signals comprising at least one of: first positioning signals orthogonal to the synchronization signals of the cellular network in a time domain; second positioning signals orthogonal to the synchronization signals of the cellular network in a frequency domain; third positioning signals transmitted during gaps in which nearby macro-cells of the cellular network do not transmit synchronization, the third positioning signals having a transmission power lower than a threshold power, so as not to overwhelm the synchronization signals transmitted by farther macro-cells.

Optionally, prior to the receiving of the synchronization signal, the positioning cells are configured for performing an analysis of the cellular network, and synchronizing with the cellular network based on the analysis, in order to turn on respective reception antennas at every cycle for respective time intervals within which the cellular synchronization signal is expected to arrive at the respective positioning cells.

Optionally, the positioning cells are configured for analyzing the cellular network by: receiving a plurality of synchronization signals from a multitude of multi-operator broadcasting sites of the cellular network; using predetermined information indicative of a distance traveled by each of the plurality of synchronization signals and of a constant timing offset between synchronization signals associated with different operators, to average the times of arrival of the plurality of signals.

Optionally, the positioning cells are configured for analyzing the cellular network by: applying a predetermined filter to the plurality of synchronization signals to reduce effect of fluctuations in a synchronization of macro cells of the cellular network.

Optionally, the positioning cells are configured for transmitting the positioning signals in at least one of the following spectra: a spectrum of a given operator in the cellular network; a spectrum of a plurality of operators in the cellular network; and an unlicensed spectrum not associated with any operator in the cellular network.

Optionally, the positioning cells are configured for initially connecting to the communication device in a manner that does not use the cellular network, receive information relating to cellular network from the communication device, and only then listening to the cellular network according to the received information relating to cellular network.

Optionally, each cycle is about 10 seconds.

Optionally, each cycle is about 1 second.

Optionally, any given positioning cell is configured for: listening to at least one previous positioning cell; determining the time difference between the time of arrival of the positioning signal emitted by the previous positioning cell and a theoretical time of arrival that would occur if the positioning signal emitted by the previous positioning cell took a shortest path from the previous positioning cell to the given positioning cell; and emitting a respective positioning signal at a time interval following reception of the previous positioning cell's positioning signal, the time interval being equal to a predetermined delay minus the time difference.

Optionally, the any given positioning cell is configured to determine the time difference by one of: having access to a distance of the shortest path from the previous positioning cell, and calculating the time difference; relaying the time of arrival of the of the positioning signal emitted by the previous positioning cell to a control unit, and receiving from the control unit the time difference.

Optionally, the any given positioning cell is in line on sight with the previous positioning cell.

Optionally, the positioning cells are set in groups; the positioning cells belonging to any same group are configured for emitting the respective positioning signals at the same time; each group of positioning cells is configured for emitting the respective positioning signals in quick succession at respective times following the synchronization signal; at least one first positioning cell of any given group is configured for listening to at least one second positioning signal emitted by at least one second positioning cell; the at least one first positioning cell is configured for determining a time difference between the time of arrival of the second positioning signal at the first positioning cell and a respective theoretical time of arrival that would occur if the at least one second positioning cell were synchronized with the at least one first positioning cell; the at least one first positioning cell is configured for transmitting data indicative of the difference to the at least one second positioning cell by wire or wirelessly; the at least one second positioning cell is configured to adjust a timing of emission of the second positioning signal according to the difference, in order to synchronize with the at least one first positioning cell.

Optionally, a plurality of first positioning cells are configured for receiving at least some second positioning signals emitted by at least some second positioning cells, the first positioning cells belonging to a same first group or to a plurality of distinct first groups; the first positioning cells are configured for creating a plurality of respective maps of time differences between the times of arrival of the second positioning signals and respective theoretical times of arrival that would occur if the second positioning cells were synchronized with the first positioning cells; the first positioning cells are configured for transmitting data indicative of the respective maps to the at least some second positioning cells by wire or wirelessly; each of the second positioning cells is configured for receiving the plurality of maps, and for extracting therefrom respective data relating to time differences associated with the second positioning signal emitted by the second positioning cell relative to the plurality of first positioning cells; each of the second positioning cells is configured for processing the data extracted from the plurality of maps to determine a respective adjustment in a respective timing of emission of the specific positioning signal, in order to synchronize with the plurality of first positioning cells in a present cycle or in a subsequent cycle.

Optionally, the map comprises information relating to qualities of the positioning signals emitted by at least some of the second positioning cells; and each of the second positioning cells is configured for determining the respective adjustment by calculating a weighted average of time differences relative to the plurality of first positioning cells, each weight applied to a time difference being a measure of a quality of the positioning signal associated with the time difference.

Optionally, each of the first positioning cells is configured for receiving the at least some second positioning signals emitted by the at least some second positioning cells which do not belong a group of the first positioning cell.

Optionally, at least one group consists of a single positioning cell.

Optionally, at least one group consists of two or more positioning cells.

Optionally, all the positioning cells in the system form a single group; each positioning cell comprises a respective antenna system configured for emitting the respective positioning signal while listening to positioning signals emitted by at least some other positioning cells.

Optionally, the at least one first positioning cell is configured to determine the time difference by one of: having access to a distance of the shortest path from the at least one second positioning cell, and calculating the time difference; relaying the time of arrival of the second positioning cell to a control unit, and receiving from the control unit the time difference.

Optionally, each first positioning cell is configured to determine the map by one of: having access to information indicative of distances of the first positioning cell from the at least some second positioning cells, and calculating time differences between the times of arrival of the second positioning signals and respective theoretical times of arrival that would occur if the second positioning cells were synchronized with the first positioning cells; relaying the times of arrival of the second positioning cells to a control unit, and receiving from the control unit map.

Optionally, (i) the first positioning cell is a master cell connected to AC power and synchronized with the cellular network, the master cell being configured for emitting a beacon at every cycle in response to a reception of each cycle's synchronization signal; (ii) a plurality of second positioning cells are slave cells, configured for: turning on for a predetermined time length at every cycle in order to listen for the beacon; receiving the beacon; and emitting second positioning signals at a predetermined time period following reception of the beacon, such that the second positioning signals are received by the communication device shortly after the communication device receives the synchronization signal, while the communication device still listens; (iii) the master cell is configured for receiving the slave positioning signals and compiling a map of time differences between the times of arrival of the slave positioning signals and respective theoretical times of arrival that would occur if the slave cells were synchronized with the first master cells; (iv) the master cell is configured for sending data indicative of the map to the slave cells; (v) each slave cell is configured for extracting from the data indicative of the map respective information indicative of a respective adjustment in timing of emission of the respective slave positioning signal for a subsequent cycle; (vi) in the subsequent cycle, each slave cell is configured for adjusting the time of emission and for adjusting a beginning and end of the predetermined time length.

Optionally, the master cell is further configured for emitting a master positioning signal at a second predetermined time after emitting the beacon, such that the master positioning signal is synchronized with the slave positioning signals.

Optionally, the master positioning cell is in line of sight with all the slave positioning cells.

Optionally, the system includes a plurality of master positioning cells, and a plurality of slave positioning cells wherein: the master positioning cells are configured for synchronizing with each other; following the synchronization, the master positioning cells are configured for emitting respective beacons at each cycle; each of the slave positioning cells is configured for: receiving the plurality of beacons, calculating theoretical times of arrival of the beacons by using respective known distances of the slave positioning cell from the master positioning cells; calculating a plurality of differences, each difference being a difference between the theoretical time of arrival associated with a respective master and a time of arrival of the respective master's beacon; selecting the smallest difference; and emitting a slave positioning signal at a predetermined time following the time of arrival of the beacon associated with the smallest difference.

Optionally, the master positioning cells are in line of sight with each other.

Optionally, (i) the master positioning cells comprise a main master communication cell and a plurality of secondary master communication cells in line of sight with each other; (ii) the secondary master positioning cells are configured to: synchronize with each other during a first synchronization stage, when first turned on; and synchronize with the main master positioning cell during a second synchronization stage following the first synchronization stage; (iii) the main master communication cell is configured for emitting a master beacon upon reception of the synchronization signal from the cellular network, and the secondary master positioning cells are configured for emitting respective secondary beacons at predetermined times following the master beacons; (iv) each of the slave positioning cells is configured for: receiving the plurality of secondary beacons, calculating theoretical times of arrival of the secondary beacons by using respective known distances of the slave positioning cell from the secondary master positioning cells; calculating a plurality of differences, each difference being a difference between the theoretical time of arrival associated with a respective secondary master positioning cell and a time of arrival of the respective secondary master beacon; selecting the smallest difference; and emitting a slave positioning signal at a predetermined time following the time of arrival of the secondary beacon associated with the smallest difference.

Optionally, the system further comprises the server.

Optionally, the system comprises a central control unit connected to the positioning cells and to the server, and configured for coordinating an operation between positioning cells and transfer of data between the positioning cells and the server.

Optionally, the central control unit is in a form of a cloud service.

Optionally, the cloud service comprises a plurality of processing elements distributed over a plurality of locations.

Optionally, the cloud service is configured for using the processing units associated with the positioning cells and/or the server.

Another aspect of some embodiments of the present invention relates to a positioning system configured for being used in conjunction with a server and a communication device synchronized with a cellular network, the positioning system comprising a plurality of positioning cells. Each positioning cell comprising an antenna unit configured for emitting and receiving radio-frequency signals, and being associated with a non-volatile memory unit configured for storing data, a processing unit configured for processing data and for controlling an operation of the antenna unit, and a power source configured for powering the antenna unit. At least one of the positioning cells is connected to a cellular network, and the positioning cells are configured for emitting respective positioning signals receivable by the communication device in a frequency used by the cellular network, in response to the reception of a synchronization signal emitted by the cellular network, each positioning signal comprising data indicative of an identifier of the positioning cell that emitted the positioning signal; the server is in communication with the communication device, the server being configured for: receiving from the communication device first data indicative of times of arrival of the positioning signals to the communication device, each piece of data indicative of a time of arrival being appended with an identifier of the associated positioning cell; processing the times of arrival and using known positions of the positioning cells to determine a position of communication device with respect to the positioning cells; and sending to the communication device second data indicative of the position. The positioning cells comprise a master positioning cell and a plurality of slave positioning cell, the master cell being synchronized with the cellular network, and being configured for emitting a beacon at every cycle in response to a reception of each cycle's synchronization signal; the slave positioning cells are configured for: turning on for a predetermined time length at every cycle in order to listen for the beacon; receiving the beacon; and emitting second positioning signals at a predetermined time period following reception of the beacon, such that the second positioning signals are received by the communication device shortly after the communication device receives the synchronization signal, while the communication device still listens.

Optionally, each slave positioning cell is configured for transmitting during a respective time slot, so that the slave positioning cells are configured for transmitting sequentially one after the other in quick succession.

Optionally, each slave positioning cell is configured for: listening to at least one previous slave positioning cell; determining the time difference between the time of arrival of the slave positioning signal emitted by the previous slave positioning cell and a theoretical time of arrival that would occur if the slave positioning signal emitted by the previous slave positioning cell took a shortest path from the previous slave positioning cell to the given slave positioning cell; and emitting a respective slave positioning signal at a time interval following reception of the previous slave positioning cell's slave positioning signal, the time interval being equal to a predetermined delay minus the time difference.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
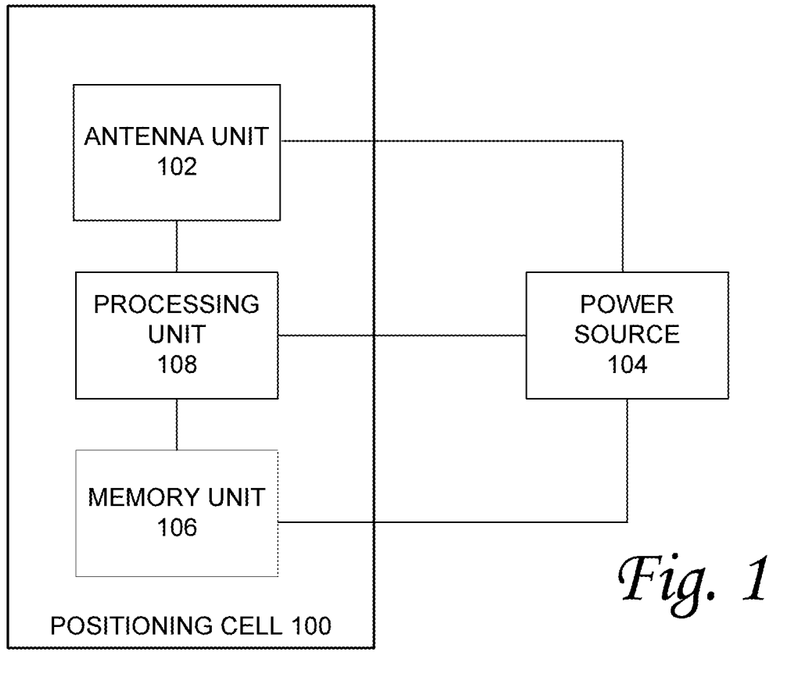
FIGS. 1 and 2 are box diagrams illustrating different structures of a positioning cell, according to some embodiments of the present invention.
Figure 2:
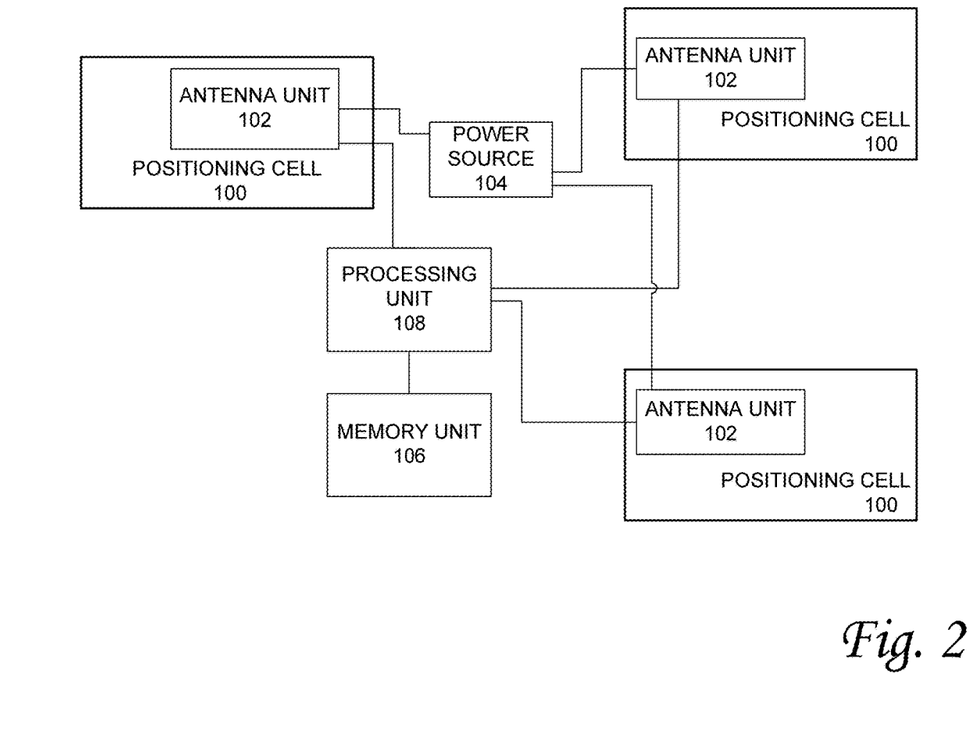

Reference is now made to the drawings. FIGS. 1 and 2 illustrate different structures of positioning cells of the present invention. A positioning cell 100 of the present invention includes an antenna unit 102 configured for receiving and emitting radio frequency (RF) signals, and is associated with a power source 104, a non-volatile memory unit 106 configured for storing data, and a processing unit 108 configured for receiving, processing, and outputting data, and for controlling an operation of the antenna unit according to stored, input, or outputted data. The antenna unit 102 is configured, inter alia, for emitting positioning signals which include data indicative of the identity of the positioning cell that has emitted the signal.

In the embodiment of FIG. 1, the positioning cell 100 is a self-contained device which includes the antenna unit 102, a respective memory unit 106, and a respective processing unit 108. The positioning cell 100 may include its own power source 104, or may be configured for connecting to a power source.

In the embodiment of FIG. 1, the positioning cell 100 is a self-contained device which includes the antenna unit 102, a respective memory unit 106, and a respective processing unit 108. The positioning cell 100 may include its own power source 104, or may be configured for connecting to a power source. In such an embodiment, each positioning cell 100 is configured for processing data independently of each other, and are configured for relaying processed data to each other by wire or wirelessly.

In the embodiment of FIG. 2, a positioning cell 100 includes the antenna unit 102, and can be connected to a central processing unit 108 and a central power source 104, which may be shared by a plurality of positioning cells. The processing unit is connected to the memory unit 106, which is also external to the positioning cell. In such an embodiment, the positioning cells 100 are configured for relating measured parameters to the central processing unit, and the central processing unit is configured for processing the measured parameters and controlling the operation of antenna units of the positioning cells accordingly.

Figure 3:
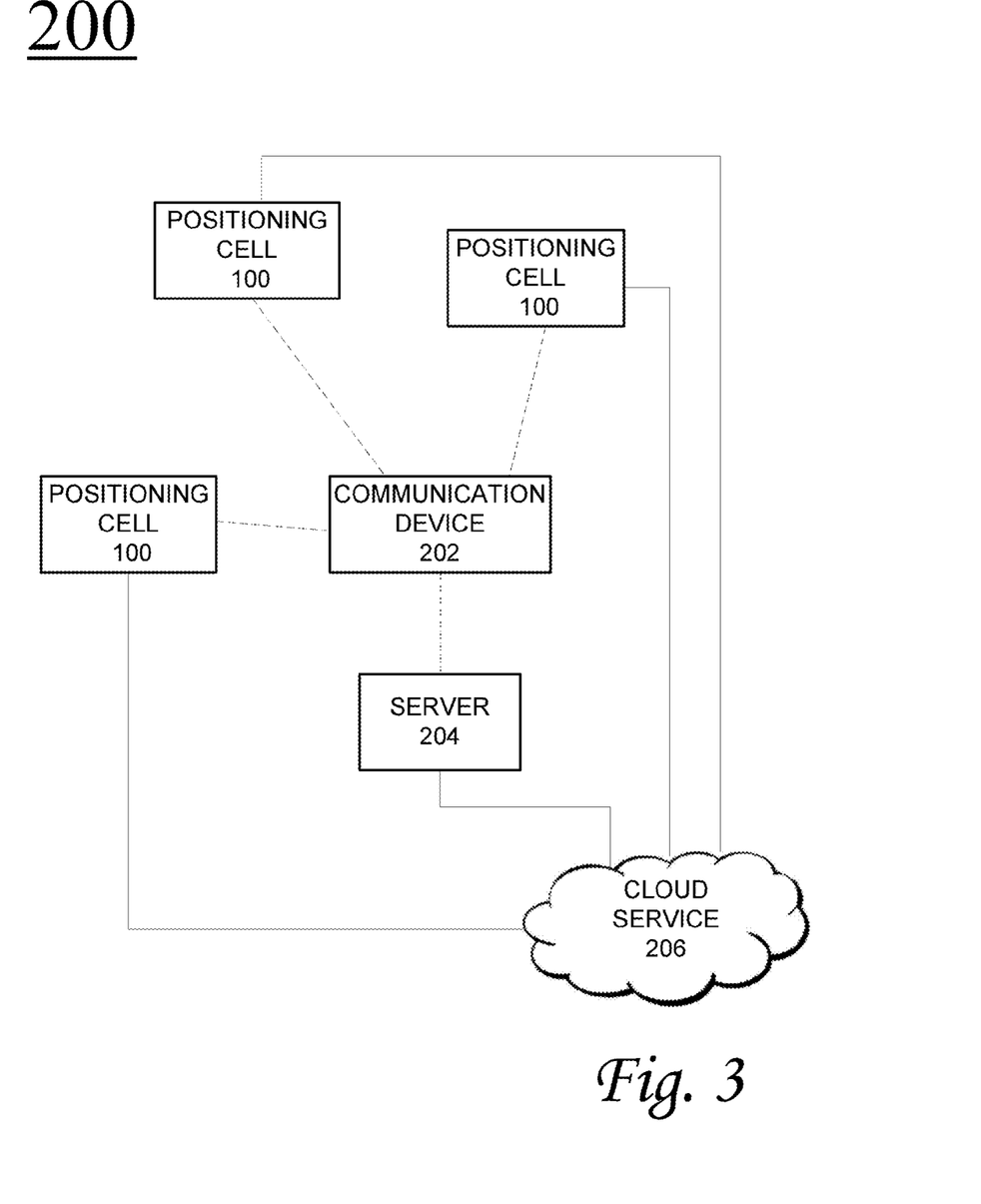
FIG. 3 is a box diagram illustrating a system for locating a communication device connected to the cellular network, according to some embodiments of the present invention.

Reference is now made to FIG. 3, which is a box diagram illustrating a positioning system, according to some embodiments of the present invention.

The system 200 includes a plurality (two or more) positioning cells, at least one of which is in direct or indirect communication with the cellular network. The system 200 is configured for being used in conjunction with a communication device 202 communication with the cellular network and a server 204. The communication device may be a cellular phone, a tablet, a laptop computer, and is configured for receiving positioning signal from the positioning cells 100. The communication device 202 records the times of arrival of the different positioning signals, and sends the times of arrival and identifiers of the positioning cells appended to each time of arrival to the server 204. The sever 204 has access to data indicative of the positions of the positioning cells, that may have been input into the server when the system 200 is set up or may be contained encrypted in the positioning signals. By processing the times or arrival and with the positions of the positioning cells, the server 204 calculates the position of the communication device 202 with respect to the positioning cells. The server sends data indicative of the calculated position to the communication device 202. The communication device includes software and/or hardware configured for displaying the position of the communication device.

In order to be "heard" by the communication device, the positioning cells are configured for emitting positioning signals at times when the communication device's antenna is on for receiving signals from the cellular network. Furthermore, in order to determine the position of the communication device at a high precision (1-3 meters), the positioning cells 100 are to be synchronized tightly with each other.

Firstly, the system 200 is to be synchronized with the cellular network. Second, a tight synchronization between the positioning cells is to be established.

Synchronization with the Cellular Network

Initially, the positioning cells are turned on. For initial programming and to receive network assistance info, each positioning cell may listen to a nearby user communication device (e.g. phone) with proper credentials for assistance data (network assistance), e.g. via Bluetooth or WiFi connection. The assistance data provides frequency bands and bandwidth to listen to, physical cell IDs (PCI) of neighboring (macro, small) cells, PCI of neighboring positioning cells if known, frame type, cyclic prefix type, number of antenna ports, etc.

Via the assistance data, the positioning cell tunes in to listen to the cellular system, e.g. LTE (4G). The positioning cell enters a monitor mode and listens to all bands and operators of the cellular system. In the case of LTE (4G), the positioning cell listens to the synchronization and acquisition signals (PSS/SSS) to find the frame synchronization and the physical cell ID (PCI) of the strongest (macro or small) cell(s) of the cellular network. The cellular network's signals may be analyzed without broadcast decoding or control decoding or data channel decoding. SSS decoding may be unnecessary if assistance data informs the positioning cell of the neighboring PCIs. The lack of decoding may save battery of the positioning cell.

The best operator may be determined by measuring the energy in each band. Optionally, the Received Signal Strength Indicator (RSSI) in each band is measured. In some embodiments of the present invention, RSSI can be measured in the RF block without enabling the Base Band (BB) block of the antenna unit. The strongest RSSI usually signals the best operator. Strongest cell/operator may be determined in a limited 1 MHz bandwidth if a lot of the signal processing occurs in that limited bandwidth.

The positioning cell determines frequency precisely from the strongest heard cell on the network (any operator) via its cell-specific reference signal (CRS) pilots. Optionally, the positioning cell may analyze narrow band for frequency estimation to save battery, if needed. Optionally, the positioning cell may analyze a wide band, which enables turning on the RF block for very short period. Analysis of a narrow band may require Fast Fourier Transform signal processing.

The positioning cell determines timing synchronization based on strongest cell PSS (any network), which automatically provides the timing for the remaining networks (based on offsets provided via assistance info). PSS for a strong cell may be limited to 1 or 2 bits correlation (i.e. adders only) to avoid the use of multipliers.

More precise timing may be obtained from the CRS pilots of the strong cell, with a wide bandwidth.

Optionally, for the few strongest cells (any operators), the positioning cell provides differential time of arrival measurements (via CRS pilot). The information can be sent to the communication device 202 and then to a cloud service 206 for further processing. The cloud service 206 functions that is connected to the server and to the positioning cells. The cloud service acts a central control unit for a network which includes the server and the positioning units, and is configured for processing data and requests, managing databases, and coordinating operations of the positioning units. The cloud service may include one or more processing units and/or memory units, which may be located at a central location or may be distributed over a plurality of locations. The cloud service may tap into the processing units and memory units that are associated with the positioning cells and/or with the server, in order perform some of its operations. Connection between the elements of the cloud service may be wired or wireless, and may be achieved via any kind of network, such as the internet and/or the cellular network. By knowing the (approximate) position of the positioning cell, the cloud service 206 can determine the approximate distance between the positioning cell and the measured cells of the cellular network. This information can be used to correct the synchronization of the positioning cell, which can be off due to non-line-of-sight (NLOS) extra delay or multipath errors. The information can also be used to advance the transmission of the positioning cell so that it better aligns with the macro cell's symbols. Alternatively, the communication device 202 may inform the positioning cell 100 of the desired timing advance for a given cell of the cellular network, since the communication device has access to this information via its cellular network connection, or via a known approximate distance to a cell site. The information is used for timing advance or timing alignment in the positioning cell 100, as required per some predefined protocol.

The positioning cell 100 obtains the 5 ms half-frame boundary from the PSS signal. It may decode one SSS of a strong cell in order to obtain the 10 ms boundary. Or it may guess the 10 ms boundary by trying two hypotheses of CRS pilots (those of subframe 0 pilots, for example, tried every 5 ms). The CRS hypothesis that exhibits stronger energy in the measured impulse response leads to the 10 ms boundary. CRS could be limited to a short bandwidth and this operation might be, in some cases, less costly than decoding SSS.

Next, the positioning cell 100 is configured for determining the System Frame Number (SFN), which is usually found by decoding the physical broadcast channel PBCH. But this is a relatively costly operation. Thus, two variants are provided for replacing the decoding of the PBCH.

In a first variant the positioning cell 100 decodes only the strongest cell PBCH without Viterbi decoding. There is sufficient repetition and interleaving, number of antennas is known, certain bits can be known, averaging can be performed over several frames (using a low cost channel estimation), and if the average SNR reaches 10 dB, then the PBCH can be decoded at relatively low cost.

In a second variant, the communication device 202 provides the SFN number, which it knows. For this to occur, the communication device 202 needs to connect to the positioning cell 100 with the 10 ms time resolution. A protocol like Bluetooth should offer such an option with time stamps at the low level (TBC) so when a packet is decoded by upper layers, the time instant at which it was transmitted can be determined. This time instant is used by the positioning cell 100 to determine what the SFN was at that point.

Positioning reference signal (PRS) positioning pilot configuration and a virtual PCI with its own configuration are provided by the cellular network to the positioning cell 100. The positioning cell 100 can then start transmitting PRS pilots (positioning signals), initially without fine synchronization.

Note that positioning cells exchange messages with the cellular network, which centralizes decisions on PCI, synchronization, etc. The positioning cells could talk to the network just like any user device, via regular control and data channels. Optionally, the positioning cells are not directly connected to the network, and take decisions related to their own configurations. In such an embodiment, a communication device in the venue with the proper credentials can hear the self-decision of the positioning cells and then informs the network of such decisions. If there is an issue, a low power connection (e.g. Bluetooth) between the communication device and positioning cell could inform the positioning cell to change certain parameters. This saves adding to the positioning cell a full cellular connection. Regularly (e.g. once a week) a communication device with proper credentials checks the status of the positioning cells, whether it has reported some interference issues with the cellular network, and mediates between the positioning cell and the cellular network.

The positioning cells also automatically (or via network assistance, that can be received via a user device) determine the cellular positioning signals' patterns (PRS patterns). The positioning cells select their own PRS patterns (virtual PCI) or select the PRS patterns with network assistance.

The positioning cell 100 is informed of PRS configuration and virtual PCI of other positioning cells 100 in the neighborhood, and if there is a need to synchronize more precisely to them. A transmission pattern is provided where some positioning cells transmit and others listen. The listening positioning cells determine the differential time of arrival between transmitting cells. They inform the communication device 202 and hence the cloud service 206=Based on known position of each positioning cell, the cloud service 206 informs positioning cells to advance or delay the timing of emission of positioning signals.

Battery saving in the positioning cells can be achieved by using low cost low quality RF blocks with few ADC (analog-to-digital converter) bits (1-3 bits, for example), which are sufficient to listen to strong cells. DAC (digital-to-analog converter) can also have few bits, 1 bit in particular, if the positioning cell transmits time domain positioning signals (PRS pilots). Using 1 bit or few bits DAC a small distortion in the positioning signals may result in leakage (or interference) of a subcarrier onto adjacent subcarriers. Distorted positioning signals should not be an issue in general if distortion only slightly leaks onto adjacent subcarriers, and is kept low.

In some embodiments of the present invention, if a positioning cell reboots due to some bug, the whole procedure has to be restarted. This requires a connection to the communication device 202. The communication device may detect at some point the missing PRS pilot transmission by the positioning cell and triggers a request to reinitiate the procedure. The procedure is also needed after battery change. However, the parameters and decisions may be stored in some memory unit inside the positioning cell (if feasible for a battery operated version) and reused after reboot. But this assumes SFN is obtained via PBCH decoding; and other decisions such as PCI are remembered in memory unit.

If the macro cells of the cellular network reboot or change configuration, the positioning cells have to be reinitiated if they are battery operated. If the positioning cells are not battery operated, they can rediscover most information on their own, e.g. by decoding PBCH and SIB information, etc).

If PRS configuration of any operator in the cellular network changes, again battery operated positioning cells have to be reinitiated or informed of the change in configuration.

Positioning cells 100 may improve emergency responses by providing more accurate position. Moreover, they can be kept totally orthogonal (code/time/frequency orthogonal) to the other PRS from the cells of the cellular network, as will be explained below. Or, if the operators share the PRS burden, they can mute the macro cells in some PRS slots and let the positioning cells 100 only transmit during those macro-muted times.

Design of Positioning Signals Emitted by the Positioning Cells

Optionally, in order to prevent confusion of the PCIs assigned to the positioning cells with PCI of macro cells belonging to the cellular network, a set of PCIs could be reserved for each positioning cell. Or a virtual PCI could be selected which can be a reused (recycled) PCI with some time offset, preferably circular time shift (which can be performed with an additional phase ramp in frequency domain, or via cyclic shift per symbol in time domain). If a macro cell is no more than 5 km from the positioning cell, and with a channel of no more than 4 km, then the PCI of the macro cell can be recycled with a cyclic shift of 10 km, for example. If distances and channels are less than the above non-limiting exemplary values, several positioning cells could use different shifts, provided channel impulse responses don't collide. Each channel from a given positioning cell to a communication device occupies a certain amount of time within an OFDM symbol. After the last hearable echoes are received by a channel in the communication device, any remaining echoes are too weak to make any noticeable difference in the received signal. The total duration is of a channel is, for example, 10 microseconds. If the OFDM symbol is 70 microseconds, for example, then we can fit 7 channels where each is cyclic shifted in time domain to occupy 10 out of 70 microseconds.

Optionally, in order to further increase orthogonality between signals of the cellular network and signals emitted by the positioning cells 100, a time domain cover code can be added to each positioning cell. So symbols are, for example, multiplied by +1 or −1 in order to render them orthogonal after averaging nearby symbol, provided the device is not moving excessively fast. This is a correct assumption for the present system, which is configured for locating a communication device travelling is a small environment at very low speed user devices. By using both (cyclic) time shifts and orthogonal time cover codes (for a given fixed scrambling code, i.e. PCI), the space of PCI can be substantially increased to contain more virtual PCIs that can be assigned to positioning cells. Such positioning cells emit signals that do not interfere with the cellular network. Some of the virtual PCI could be used for antenna diversity (i.e. transmit from a second antenna port). Antenna diversity can be achieved by concatenating the transmissions from same cell but different antenna. This is equivalent to adding more cells, as each antenna may be considered its own cell. Hence, additional virtual PCI can be created with cyclic time shifts; each cell, or each antenna occupies a different cyclic time shift.

As such, many virtual PCI can be created and, with a minimal control from the network side, they will not collide (in terms of channel impulse response). Virtual PCI may require a standard change or they can be part of a proprietary solution and offering. This is because current 3GPP standard does not specify such virtual PCI as explained above. Hence, we need to add these virtual PCIs to the standard so that both transmitters (positioning cells) and receivers (communication devices) manufactured by different companies, know how to inter-operate. So either a standard change or a proprietary change may be required. In the latter case, one company may create a proprietary end-to-end solution (positioning cells and mobile phone software) or a few companies may collaborate and agree on a common proprietary standard between them.

With regard to a choice of operator or a plurality of operators in the cellular network, it should be noted that each poisoning cells 100 needs a virtual PCI per operator and per frequency band that they use. In order to save RF resources, a positioning cell may transmit on one (or a few bands) at a time. In the event that a positioning cell needs to transmit a positioning signal (PRS pilot) on two bands or more (i.e. two operators or more) at the same time, the positioning cell may alternate between the two (or more) PCIs, transmitting every alternate time for one of them. This is a PRS muting mechanism, in which a positioning cell is supposed to transmit every X seconds but instead it transmits every 2X seconds, for example. Every other transmission is muted. Optionally, the cloud service is informed of the muting pattern, and it informs the user device.

In some embodiments of the present invention, multi-bands and/or multi-operator positioning signals can be concatenated into one band when feasible (transmitted at the same time), which results in a wider band. Optionally, the positioning cell ensures same phase/amplitude and well known timing for each band transmission. In this embodiment, a communication device with wide band capabilities (e.g. carrier aggregation) may combine in phase received positioning signals from multiple bands/operators to obtain a more precise determination of its position. This is possible if the channel of the communication device did not change much. For example, for a walking person, the time between two band transmissions (to be concatenated) should be less than 50 to 100 ms. If the channel of the communication device has changed substantially between the measured otherwise, received positioning signals from multiple bands/operators may be combined in power instead.

In some embodiments of the present invention, a positioning cell is configured to transmit on a unique band, while communication devices associated with other operators know what band the positioning cell transmits and are able to tune to such band for determining their own positions. In this case, we save bandwidth for the other operators. This is possible in the case in which different operators share their own positioning/synchronizing pilot bandwidth to reduce the wasted bandwidth. In a related embodiment, for example, rather than transmitting PRS every 200 ms, an operator can transmit PRS every 600 ms. Two other operators can also send PRS every 600 ms, interspersed or interleaved preferably at constant intervals. A communication device listening to a certain operator, can then use regular gaps to listen to the PRS of a different operator. Thus, for a slow moving communication device, this solution provides more sites with better geometry to perform position location. In other words, instead of each operator carrying the full cost of PRS transmission (i.e. reserving bandwidth for PRS), in order to permit acceptable mobile positioning based on its own network alone, the burden or cost can be split between two or more operators. Each operator transmits fewer instances of PRS pilots (e.g. every 2X or every 3X seconds, instead of every X seconds). Then when the operator is muting its own transmissions, another operator performs its own transmissions (again at a rate of every 2X or 3X seconds). The transmissions from 2 or more operators can be either interleaved about equally in time (which ensures best performance for a fast moving device) or positioned very near in time (with longer silence periods) such that a device wakes up and listens to all 2 or 3 operators, quickly one after the other, performs the positioning operation and returns to sleep. Optionally, battery life of the device is favored at the expense of speed (since transmissions are not interleaved equally in time domain but are emitted next to each other with long empty periods).

Positioning cells controlled by the cellular network, may transmit/emit positioning signals (PRS pilots) in unlicensed spectrum. There is a very strong incentive for using the unlicensed spectrum, as the positioning signals emitted by the positioning cells are completely transparent and invisible to operators of the cellular network. Therefore, interference between the cellular network and positioning system is eliminated.

If there is no listen-before-talk (LBT) constraint, the configuration of the positioning cells is performed as described above for the licensed spectrum. The communication device may use its WiFi, BlueTooth, or other module to listen to the positioning signals. They may have a similar (or identical) structure to those used in the cellular licensed band. The cloud service informs the communication device that the band is an unlicensed band with given center frequency and bandwidth. Bandwidth in the unlicensed spectrum may be far wider and different PRS pilots can be designed.

In some embodiments of the present invention, given the short distances and channels indoor, the positioning cells may emit positioning signals designed for either licensed or unlicensed spectrum to take that into account. In particular, symbol and FFT size could be much shorter to reduce power consumption or memory requirement. The symbols may still be overlaid onto the PRS region of the cellular network, and they can be orthogonal to the PRS signals of the cellular network, but the user device can be informed that these are shorter symbols.

Geo-Location of Positioning Cells

In some embodiments of the present invention, the positions of the positioning cells with respect to the cellular network and to each other are known a priori, and input into the server or the memory module(s) associated with the positioning cells. Alternatively, once positioning cells are turned on and configured, they are configured for determining the positions of other positioning cells in their vicinity.

Determining the geographical location of the positioning cell 100, which is indoor, is a complicated problem in general. GPS does not function properly. One solution is to use low frequency with very long correlation (since the positioning cell 100 is fixed) to ensure the almost direct path between positioning cells is detected. Then multilateration provides reasonably precise location information if many cells (multi-operators) are involved (multiple differential time of arrival measurements). Very long correlation can be achieved with PRS pilots emitted by the positioning cells or CRS pilots emitted by the cellular network, provided minimal channel movement. Power combining is an option too. Multiple attempts are made and network load is evaluated (very early morning could be a right time for low network load).

Cell's height, on the other hand, can be an input provided by the installer, and that improves x, y positioning. Residual NLOS can be detected if multilateration hyperbolas don't intersect at the same point (or if the triangulation residual error is not considered small, e.g. many meter errors).

Multi-antenna transmissions may also be used. Optionally, when trying to position an indoor positioning cell, additional positioning cells are placed adjacent to each other (within centimeters). This setup creates the equivalent of multi-antenna reception and improves the determination of positions of the positioning cells. Alternatively, a positioning cell is slightly moved each day during the process until "good" position is achieved. A "good" positioning has been achieved when the multilateration residual error, for all cells, is small, i.e. a few meters. Once positioned accurately, there is no need for the extra devices or for moving the positioning cell anymore. Once the position of one positioning cell is accurately determined with respect to the cellular network, the positioning cell can help in positioning other positioning cells.

In addition to the above solutions, or alternatively, we a large number of measurements may mobile devices be used to locate (or fine tune the location of) positioning cells in a cluster of positioning cells having unknown (and/or known) positions.

Each Time of Arrival (TOA) measurement by a mobile device can be written as:

$$t_{ij} = t_i - t_j + d_{ij} + n_{ij}$$

Where $t_{ij}$ is the measured time of arrival j by a mobile device of the signal from positioning cell i, $t_i$ is the reference transmission time from cell i, $t_j$ is the reference reception time by mobile device j, $d_{ij}$ the ideal direct time of flight (or distance divided by speed of light) between cell i and mobile device j, $n_{ij}$ is measurement noise (noise, interference, multipath, NLOS, synchronization error, etc.).

The noise can be reduced by averaging a large number of measurements.

The variations in $t_i$ over time can be eliminated by synchronizing the cluster of cells or WiFi stations such that they don't drift with respect to each other. Hence, we can assume that $t_i$ characterizes a positioning cell over a long period of time (and when corrections are made to $t_i$ they are taken into account). Therefore, each unknown cell introduces one unknown timing $t_i$ as well as three unknown coordinates in space, x, y, z. Therefore there are a total of 4N unknowns for the cells, assuming N unknown cells.

On the other hand, it is difficult to keep $t_j$ constant for a given mobile device because the mobile device has to synchronize to something, and as it moves in space, synchronization shifts. Therefore, only the few measurements where $t_j$ does not drift significantly within the same device can be assumed to have the same $t_j$. But for simplicity of notation, we will assume each measurement has a different $t_j$. And with unknown coordinates x, y, z, a total of 4M unknowns per measurement for M measurements.

With N cells and M mobile measurements, i.e. MN equations, we need to have:

$$MN \geq 4M+4N$$

i.e.

$$M \geq 4N/(N-4)$$

measurements, in order to find a solution and locate the positioning cells or WiFi stations. Optionally, a much larger number is needed in order to reduce noise. Some of unknowns may be actually known, such as $t_j$ in successive measurements within a device before it has drifted. Other unknowns may be measured by external methods. For example, altitude z via may be measured by altimeter; x and y may be measured via GPS or OTDOA systems.

Tight Synchronization Between Positioning Cells

If multiple positioning cells are installed in a venue, and for best indoor precision, they should attempt to synchronize to each other as well to achieve a more accurate synchronization. The positioning cells exchange messages (usually the regularly transmitted positioning signals, so there is no need for extra messages) between each other. Knowing the distances to each other, the positioning cells find and agree to a finer synchronization timing than the one obtained from the outdoor macro cells.

Positioning cells synchronization between each other can be highly accurate if they are in Line-of-Sight (LOS) view with respect to each other, for example high in the ceiling or attached to lamps.

Otherwise, long term averaging of received positioning signals by each positioning cell can enable to reveal a weak first path among the set of multipath in NLOS environment.

Alternatively, if RF is calibrated between the transmission electronics/antenna and reception electronics/antenna, the round-trip delay of the signals between two positioning cells can reveal an extra delay (compared to known distance) due to NLOS environment (i.e. the true LOS is blocked). The extra delay in RTT (round trip time) is twice the NLOS delay. Hence, NLOS delay can be measured and subtracted. RTT requires each positioning cell to inform the other of the delta between the timing it has transmitted pilots and the timing it has received the pilots from the peer (or a specific message is transmitted by one positioning cell, received by the other, who then responds with time stamps, and the first positioning cell receives the response and measures the extra delay in distance). RF calibration can be achieved once every few weeks by a user device that has LOS to both positioning cells, or that is RF calibrated itself (via LOS to other positioning cells).

A user device with proper credentials can calibrate the timing between two (or more) positioning cells, especially if it has LOS visibility to each positioning cell and knows the distances of the user device to each positioning cell. Alternatively, the user device can calibrate the timing between positioning cells by averaging a multitude of measurements in NLOS, while knowing true distances to the positioning cells. Averaging reduces NLOS error.

The user device may perform the calibration once a week, for example, to determine a calibration correction offset (due to extra delay due to NLOS between the two positioning cells). In the remainder of the week, the calibration offset is subtracted to obtain synchronization between the two positioning cells, each time they synchronize to each other (the calibration offset is a measure of extra delay due to NLOS). The two cells may need to filter the time of arrival measurements to reduce jitter. If a sudden and prolonged shift in timing is observed, the positioning cells may alert the server and user to perform a new calibration. A sudden prolonged shift may indicate a change in the environment where NLOS' extra delay may have changed.

Instead of using a single user device once a week tight synchronization between positioning cells may be achieved by using many measurements conducted by communication devices, namely by the devices of people who walk within the shop or venue. These devices are provided with a software application that has proper credentials. Each device has an unknown position. But with drift under control (i.e. no drift between the positioning cells but only an extra delay due to NLOS to be calibrated), and with a sufficient number of positioning cells, each measurement of the position of the communication device 202 observes an error in triangulation. It contains errors due to NLOS between the positioning cell and user device, as well as an NLOS between pairs of positioning cells (time synchronization error). A time offset is slowly added and incremented to each positioning cell until all these measurements appear to best fit in triangulation. NLOS is modelled by using an additive constant (different per positioning cell) to be calculated. It is calculated over time via large number of measurements performed by mobile devices. Thus, the constant (per positioning cell) is slowly determined in order to minimize the communication device's position multilateration residual errors averaged over long term. A convergence method can be used, for example, steepest descent or Newton Gauss method (to move the constant (per cell) in the direction that reduces the triangulation error). This requires a large amount of processing in the cloud service, similar to big data processing.

In some embodiments of the present invention, positioning cells 100 may transmit every 1 or 10 seconds, for example, if they are battery operated. Their signals can be as simple as possible for battery saving (time domain modulated signals, for example). After a first synchronization to the network and other positioning cells, the drift is be less than 0.1 ppm (parts per million). Hence, every 10 seconds, the drift may reach 1 μs, which is large (300 meters). This problem can be mitigated as follows. Positioning cells are configured for transmitting one after the other, with known small time difference between each transmission, e.g. 10 ms. Each positioning cell has a time slot reserved. Before transmitting, a positioning cell listens to the previous transmission(s) by previous positioning cell(s), and then resynchronizes to the previous positioning cell(s) before transmitting its own positioning signal. Hence, positioning cells are continuously synched to a high precision. Since resync is performed within 10 ms, drift would not exceed ins (which is 0.3 m). Optionally, any given positioning cell is in line of sight with the previous positioning cell.

According to some embodiments of the present inventions, the positioning cells are organized in groups. All cells in the same groups are configured for emitting respective positioning signals at the same time. Each group is allotted a respective time interval for emitting respective positioning signals. In this manner, the groups emit signals in quick succession, as was mentioned above for individual cell.

One or more first positioning cells are configured for listening to one more second cells, and for determining respective maps differences of times or arrival (DTOA). Each map includes the differences between the times of arrival of the one or more second positioning signals at a respective first positioning cell and the times in which the second positioning signals would have reached the respective first positioning cell if they had taken the shortest paths thereto. Each first positioning cell transmits a respective map to the second cells. Each second cell receives a plurality of maps and extracts therefrom data indicative of its DTOA with respective to the first positioning cells. Each second cell processes the extracted data in order to determine an adjustment in the emission timing of the second cell necessary to keep its synchronization with the first positioning cells.

Optionally, each map includes information relating to the qualities of the positioning signals emitted by the second positioning cells, as received by the first positioning cells. In such an embodiment, each second cell processes the DTOA data by calculating a weighted average of the plurality of DTOAs. The weight associated with each DTOA is a value indicative of the quality of the respective positioning signal. The quality value related to a second positioning signal is optionally a function of the power of the second positioning signals and a distance the second positioning signal has traveled.

Any group may consist of a single positioning cell, a plurality of positioning cells (but not all the cells), or all the positioning cells. In the embodiment in which all the positioning cells are in a single group and emit at the same time, the positioning cells are configured for emitting and receiving at the same time. While this setup adds to the complexity of the antenna units, the setup is also advantageous for the communication device that is to be located, as the communication device needs to be on for a short amount of time to listen to the positioning units.

The embodiment in which each group consists of a single positioning cell, the communication device is required to be on for a longer time interval in order to listen to the succession of signals emitted by the positioning cells.

In the embodiment in which each group consists of some of the cells, there may be two variants. In a first variant, the positioning cells are configured for emit and receive at the same time. In such a variant, the cost of the positioning cells is higher, due to the complexity of the antenna units, but the communication device saves some battery, as it listens to a succession of group emissions. In the second variant, the positioning cells do not hear positioning cells of the same group. In such a variant, the cost of the positioning cells is lower since the antenna units are simpler, the communication device only listens to group emissions and therefore does not need to be on for long time intervals, however the positioning precision may suffer, since synchronization between positioning cells of the same groups is not performed directly.

In some embodiments of the present invention, the positioning cells include a master cell and a plurality of slave cells. The master cell is configured for synchronizing with the cellular network either directly or via one or more communication device, and for emitting a beacon in response to a synchronization signal of the cellular network. The slave cells are configured for emitting their slave positioning signals in response to the beacon, after a predetermined time interval has passed since the reception of the beacon. Optionally, at least some of the slave cells are configured for emitting respective positioning signals in quick succession, as described above. Optionally, the master positioning cell emits its own positioning signal after a predetermined time length has passed since the emission of the beacon.

It should be noted that if the positioning signals are BlueTooth signals or cellular signals, this synchronization may be enough to achieve a resolution of about 3-5 meters.

Optionally, the master listens to the slave positioning signals, generates a map of DTOAs, and transmits the maps to the slave signals. Optionally, the maps are transmitted by the master positioning cell to the slave positioning cells with the next beacon. The slave positioning cells are configured for adjusting their emission times, thereby enhancing their synchronization with the master positioning cells. In this manner, the resolution of the positioning can be enhanced to about 1 meter.

In some embodiments of the present invention, the slave cells are organized in groups, each group having its own transmission time slot, as discussed above. Optionally, each group listens to the other groups or to subsequent groups, and creates a plurality of DTOA maps. The DTOA maps are transmitted to the cells of the other group(s) enabling synchronization between the slave cells.

Optionally, a few master positioning cells are present. The master positioning cells initially synchronize with each other and then emit respective beacons. Each slave positioning cell receives the beacons, select the beacon having the least DTOA, and emits its respective slave positioning signal after predetermined time interval has passed since the reception of the selected beacon. Optionally all master positioning cells are in line of sight (LOS) with each other.

In some embodiments of the present invention, the master positioning cells include a main master cell and a plurality of secondary master cells. The secondary master cells synchronize to each other and then to the main master cell. Following the synchronization between the main master cell and the secondary master cells, the secondary master cells emit their beacons, for instructing the slave cells to emit respective positioning beacons, as above.

Figure 4:
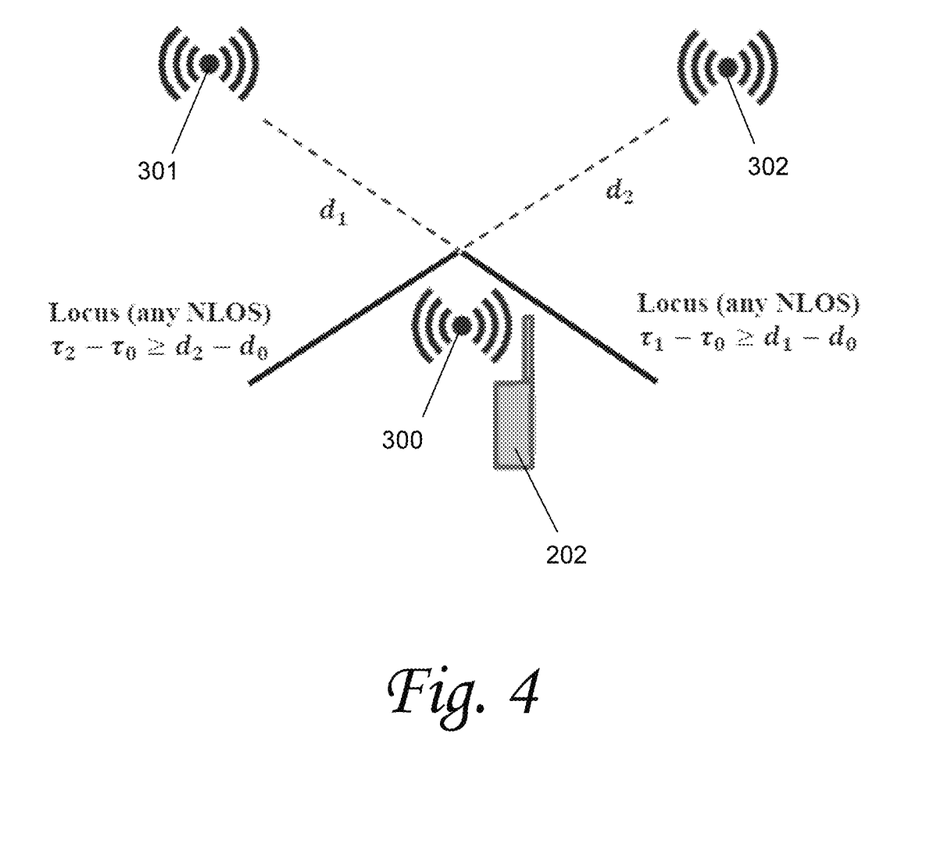
FIG. 4 is a schematic drawing illustrating a setup of the system of FIG. 3 in which NLOS impact is significantly decreased or eliminated for a location of interest.

Techniques for Decreasing NLOS Effects in the Measurement of the Position of Communication Device Placing the positioning cells near the ceiling (e.g. near lamps) can significantly reduce NLOS impact. Moreover, for a position of strong interest where we wish to know if the user is located there, FIG. 4 shows setup of the system 200 in which NLOS impact is significantly decreased or eliminated.

NLOS can be significantly eliminated at the location of interest, if one positioning cell 300 is placed near the position of interest and is used as reference positioning cell (in triangulation). Then the locus of points from two other positioning cells 301 and 302 are two hyperbolas that appear nearly like two semi-lines starting from the near beacon. Increased NLOS does not change the locus. The intersection of the two locus semi-lines confirms that the user is at the point of interest. Normally the multilateration equations can be viewed like locus of points (hyperbolas) and we find their intersection, if it exists, or the point that nearest to all hyperbolas if no one single intersection point exists. In the case of the scheme above, despite the presence of NLOS (which typically means that the hyperbolas will not intersect, or will intersect at a wrong position due to this NLOS noise), the various locus (hyperbolas) in the multilateration formulation still intersect at the correct point.

Hence, misdetection is nearly eliminated: when the communication device 202 is at the location of interest, the system determines that this, despite the presence of NLOS. But there remains a problem of false alarm where the communication device may not be at the location of interest and yet the system mistakenly detects the communication device to be at the location of interest. In order to reduce false alarms well known triangulation or positioning methods above can be combined the technique of FIG. 4 to determine false alarms, additional positioning cells may be installed. These methods may include but are not limited to measuring received signal strength from the nearby cell, Fingerprint at good location (e.g. signal strength from all cells), performing multiple measurements in time (assuming some user movement), and/or performing RTT measurement to nearby cell with some calibration of RF.

The DTOA formula can be expressed as:

$$\tau_1 - \tau_0 \geq d_1 - d_0$$

$$\tau_2 - \tau_0 \geq d_2 - d_0$$

Where the index 0 denotes the reference positioning cell 300 at the location of interest, and indices 1 and 2 denote two more positioning cells 301 and 302 for multilateration. The communication device measures the time of arrival TOA $\tau_i$, while known the true distance to each positioning cells is $d_i$. The measured TOA, or rather the DTOA difference in times of arrival, is greater than or equal to the true distance for the following reason: near the beacon 0, there is no or negligible NLOS. The hyperbola satisfying the above DTOA measurements are locus of points starting from the positioning cell 300 and forming the semi-lines opposite to the positioning cell 301 and to the positioning cell 302. Adding NLOS does or not does not change the locus (i.e. it is the same locus as for $(\tau_1 - \tau_0 = d_1 - d_0)$). Hence, misdetection is pretty much resolved since at the position of the beacon 0, we'll locate this position even in the presence of NLOS (assuming a well-functioning causal filter for high precision and to avoid negative measurements such as $\tau_1 - \tau_0 < d_1 - d_0$).

WiFi Synchronization Between Positioning Cells

Up to now, the description was mainly aimed at systems and methods for positioning a communication device via emission of positioning signals in the cellular frequency or in frequencies in which positioning cells act similarly to cellular cells, such as BlueTooth cells.

This section relates to a system of positioning cells which reuse already deployed or to be deployed WiFi stations or access points (APs). The techniques described below necessitate only software only upgrades in the communications device and WiFi stations; some options involving hardware changes to the communication device and/or WiFi stations will also be described.

It should be noted that in general WiFi stations are limited by a Listen-Before-Talk (LBT) constraint, in which each station first sense its radio environment before it starts a transmission. By performing hardware upgrades in WiFi stations and eliminating the LBT constraint, the WiFi stations could act like the positioning cells described above, with the only difference being that upgraded WiFi stations operate in the unlicensed spectrum.

Normally each AP transmits a beacon every 100 ms, that can span 20 MHz. This band is not broad enough to enable positioning within 1 meter. However, data transmission bandwidth in APs can go up to 80 or 160 MHz in 802.11ac, which is sufficient for a 1-meter precision.

Today 802.11ac precision location works by measuring round trip delays between the communication device (e.g. mobile phone) and each AP. This technique includes transmitting packets and receiving packets to each AP (at least one packet in each direction, with wideband). This technique uses the communication device's battery since the communication device has to transmit a packet and to decode a packet too. If the communication device is moved by a few meters, the packer transmission has to start again to each AP, assuming a 1 m desired precision.

In order to reduce power consumption, the inventor has adopted a technique similar to that of a synchronized network describe above. The APs listen to each other's beacons and they sync to each other. There are various protocols in star and hierarchical forms to synchronize a network of nodes. Assuming the APs are located at elevated positions and are in LOS with each other, they will tend to achieve good sync.

Once synchronized, the beacons from the APs will appear at some predetermined positions, every 100 ms. Due to carrier sense in unlicensed spectrum, beacons can slightly shift while waiting for another transmission to finish.

With only software upgrades in the APs, the APs are configured for emitting p-beacons (positioning beacon). Each AP transmits a p-beacon at a desired incidence, e.g. every 100 ms or 1s or 5 s or 10. The venue in which the APs are located determines the incidence. Generally, in a venue, the network is not so loaded, so emission of p-beacons every 100 ms or 1 s is possible. The p-beacon is at a predetermined position with respect to the normal beacon. The normal beacon includes data which indicates where the position of the p-beacon is. In this manner, the communication device does not have to search for p-beacon. The normal beacon may also indicate the position of some of the p-beacons of other APs so that the mobile does not have to search for them. Positioning beacons can be orthogonal waveforms, in time and/or frequency (orthogonal cover code over OFDM symbols, or one beacon per few OFDM symbols, and orthogonal cyclically shifted beacons over OFDM symbols). P-beacons only include pilots (unless some data is needed). It is possible to only transmit the regular pilots or more pilots if necessary. But that may require hardware changes. With more pilots, it is possible to transmit more cyclically shifted sequences; with less pilots, it is possible to use shorter IFFT.

In the simplest scheme, each AP will transmit one or more OFDM symbols, followed by next AP, and so on. A small gap could be used between transmissions. Data is null so only pilots are transmitted. This makes for minimal changes to hardware/firmware. The communication device should know the transmission scheme; so that can be fixed or indicated somehow in data carried by the first few symbols or preamble section. The total may be of the order of 100 μs. Alternatively, longer OFDM symbols are used and cyclic shifted sequences. But this is an important change to hardware. Orthogonal positioning beacons (in time of frequency) for each antenna per AP can improve time determination precision.

Rather than transmitting OFDM symbols, p-beacons may include preambles only. The same preamble could be repeated. First one is decoded but it should be very low data rate to ensure proper decoding by far cellphones. Or only the sync portion of the preamble is repeated a few times per AP; one AP after the other; with some guard band, optionally.

The preamble is in time domain. For 802.11 ac, it would be necessary to combine multi-carriers to form one wideband carrier. This is easily achieved. E.g. combining 2 adjacent sub-bands into one can be done by oversampling 2×, phase ramp shifting one sub-band to create the frequency domain shift, and adding the sub-bands up. Hence an oversampled sequence.

But given in time domain, it is a bit harder to apply our TOA with causal filters. It can be IIR filtered by an approximate TOA. Or an FFT/causal weighting/IFFT operation performed. But with 160 MHz, it may be unnecessary although it can reduce NLOS problems.

Alternatively, the transmitter AP pre-filters the sequence to give it causal shape and facilitate the task of the receiver in time domain.

An issue with repeated preambles is that they confuse other listening devices thinking there is the start of some packet. We may want modified preambles. Or some pseudo headers that don't change.

Hence the cluster chooses a time (ideally synched to cellular and known by the cellular system, with different offsets to each operator) where all WiFi APs in the cluster transmit a partial positioning beacon, e.g. one after the other, or overlapping orthogonal sequences. The time can be every 1 s or 5 s or 10 s, for example. If it is every 10 s, the search for such positioning beacons is long. In that case, the normal beacons may carry info on where is located the positioning beacon; unless things are well synched with the cellular system.

But if period is multiple of 10 ms, synched with cellular system, then it will regularly drift with respect to the usual WiFi beacons which have a period of 102.4 ms. So there will be a tradeoff. And it can be skipped when there is an overlap with beacon period. Note that other AP beacons are now thus synched, and there has to be a choice as to where to place each beacon.

Sync with cellular system might not then be the best solution. Unless WiFi beacon period is changed to 100 ms.

A solution that does not need a change of the period of the WiFi beacons involves synchronizing to cellular network, when feasible, to remove drift and accelerate locating the beacons. But then the precise synchronization takes into account some universal time/date (like linux time). This means that even if beacons and positioning beacons drift in time, they can be easily located if the universal time is known. And after a period of 10240 ms=10.240 s, the normal beacons and p-beacons repeat in terms of 10 ms units, the basic frame unit in the cellular network. Hence we just need to specify position in 10 ms intervals. An algorithm can figure out the position.

In other words, positioning beacons are synched to both normal beacons and cellular system. Normal beacons are also synched to cellular system. But both beacons and positioning beacons drift with respect to cellular system at the fixed rate of 102.4 ms minus 100 ms, i.e. 2.4 ms. Given a universal time, the drift can be entirely under control and well known by all entities (APs and communication devices). For example, at time 0, we are at 0. At time 102.4 ms comes the first normal beacon. At time 102.4 ms plus 50 ms comes the first positioning beacon, etc. This repeats at multiples of 102.4 ms. And things are synched to a universal time obtained from cellular system with a mapping between cellular system and the universal time system. The timing (and other) parameters are managed in the cellular network and delivered to communication devices and APs via applications and any kind of connections.

The p-beacon, unlike the normal beacon, spans the wideband (e.g. 80 or 160 MHz). It may span this bandwidth sub-band by sub-band (e.g. in 4 consecutive bursts of 20 MHz each, which may or may not be relatively near in time). Optionally, the APs are configured focus most of the energy of the p-beacon in the 2 outer sub-bands, ignoring the inner bands. Inner bands provide less information on time of arrival. Thus, focusing energy on the outer sub-bands can provide higher signal-to-noise ratio SNR where needed, enabling better estimates of the times of arrival and higher precision in the determination of the location of the communication device.

Unlike the normal beacon, the p-beacon does not need to be a normal packet. The p-beacon is optionally set as a very short burst and may contain only the fields sufficient to calculate a channel estimate, i.e. time of arrival (preamble, optionally fake known data, optionally orthogonal frequency-division multiplexing (OFDM) pilots without data). So the communication device only estimates a channel and does not perform any decoding with very short burst.

Since the p-beacons are synchronized to the network of nodes, precise triangulation can be performed to locate the communication device. However, due to carrier sense in unlicensed spectrum, the p-beacon may have to wait until another transmission terminates and may be required to shift in time.

If a shift is necessary, the APs are configured to shift the p-beacon by a small known amount, which is a multiple of a known unit (modulo 200 meters for example, i.e. 600 ns, or 1000 m, i.e. 3 us). By shifting the p-beacon only by multiples of 200 m, i.e. 600 ns, the communication device can determine that there was a shift, and that it needs to subtract modulo 200 m. Precision remain intact.

If the medium has to be reserved, the AP may start transmitting random bits until the p-beacon can start (this is to reserve the medium while waiting for the ideal start of the p-beacon (e.g. at a boundary of 600 ns). This method enables some already deployed older generation APs to provide accurate positioning via software upgrade.

Optionally, rather than having p-beacons 100 ms apart, the p-beacons may be configured to be 1 s or 10 s apart. However, at this level of incidence, the p-beacons will tend to drift. In order to eliminate the drift, the network nodes is made to synchronize with the cellular network.

Optionally, this is achieved by hardware adding hardware to one node, to enable the node to listen to the cellular network. Optionally or alternatively, a software upgrade is made to the communication device, to assist the AP in synchronizing to the cellular network. When the communication device enters the venue (or is at a certain distance from any one of the APs), an AP synchronizes its p-beacon to the mobile clock (which is already synched to cellular network) and the rest of the nodes follow it. After several hours, the p-beacon only shifts by 1 ms, which is still fast to locate by the communication device. When another communication device enters the range of the APs, the communication device can first look for the p-beacon at known positions with respect to the cellular network, without searching for the WiFi beacons, nor decoding WiFi beacons. This achieves better continuity between OTDOA and WiFi as the communication device moves from outdoor (cellular network) to indoor (AP network), with further reduced power consumption. The info about APs and p-beacons can be obtained from the network over 4G or WiFi (assisted info). APs can also listen to other AP p-beacons to achieve better synchronization. Optionally normal beacon and p-beacon measurements can be combined.

The normal beacon too has to be shifted by a modulo of a known unit (e.g., 200 m) in order to use it for synchronization (in case it cannot be transmitted at the right time). Assuming 10 ppb, obtained over many measurements and maintained within 100 ms period, then within 1 s the drift is 10 ns. Within 100 ms the drift is ins. The p-beacon can achieve precise sync; then the normal beacon would have to assume near LOS, and/or use long term channel statistics and knowledge gained from the p-beacon for super-resolution TOA. The beacon immediately following the p-beacon is first processed for time of arrival estimation. Then the next beacon can be based on knowledge gleaned from the previous beacon. And so on.

In some embodiments of the present invention, the APs are configured to place the p-beacons in the same 100 or 200 ms area. After the first p-beacon is transmitted (perhaps with 10 ns or 100 ns shift), the next p-beacon should shift as well by 10 ns or 100 ns. From the point of view of the communication device, everything is shifted. Transmitting p-beacons should be organized such that next AP can hear the p-beacon of the previous AP (in sequence), have the time to listen to p-beacon and adjust its p-beacon transmission. Although the whole segment of p-beacons is shifted, the first AP is informed that this shift was substantial and it should adjust a bit. Each AP can report the shift it has found and then can the emission of the first AP can be corrected by an average shift in the next cycle. Furthermore, emission of the normal beacons is still used to limit the shift to no more than 50 ns.

Calibration of tx/rx (electronics and antennas) is not needed. The second p-beacon measures the shift in time of arrival of the first p-beacon. Then it shifts its transmitter by the same amount. As mentioned above, optionally there is LOS condition between APs (placed in ceiling, for example) and normal beacon (not just the p-beacons) can be used for AP synchronization. Moreover, in LOS we prevent the issue of sudden jumps due to NLOS.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A positioning system configured for being used in conjunction with a server and a communication device synchronized with a cellular network, the positioning system comprising:

a plurality of positioning cells, each positioning cell comprising an antenna unit configured for emitting and receiving radio-frequency signals, and being associated with a non-volatile memory unit configured for storing data, a processing unit configured for processing data and for controlling an operation of the antenna unit, and a power source configured for powering the antenna unit;

wherein, at least one of the positioning cells is connected to a cellular network, and the positioning cells are configured for emitting respective positioning signals receivable by the communication device in a frequency used by the cellular network, in response to the reception of a synchronization signal emitted by the cellular network, each positioning signal comprising data indicative of an identifier of the positioning cell that emitted the positioning signal;

wherein the positioning cells are configured for transmitting the positioning signals in at least one of the following spectra:
 a spectrum of a given operator in the cellular network;
 a spectrum of a plurality of operators in the cellular network; and
 an unlicensed spectrum not associated with any operator in the cellular network;

wherein the positioning cells are set in groups;

the positioning cells belonging to any same group are configured for emitting the respective positioning signals at the same time;

each group of positioning cells is configured for emitting the respective positioning signals in quick succession at respective times following the synchronization signal;

at least one first positioning cell of any given group is configured for listening to at least one second positioning signal emitted by at least one second positioning cell;

the at least one first positioning cell is configured for determining a time difference between the time of arrival of the second positioning signal at the first positioning cell and a respective theoretical time of arrival that would occur if the at least one second positioning cell were synchronized with the at least one first positioning cell;

the at least one first positioning cell is configured for transmitting data indicative of the difference to the at least one second positioning cell by wire or wirelessly;

the at least one second positioning cell is configured to adjust a timing of emission of the second positioning signal according to the difference, in order to synchronize with the at least one first positioning cell; and wherein the server is in communication with the communication device, the server being configured for:
 receiving from the communication device first data indicative of times of arrival of the positioning signals to the communication device, each piece of data indicative of a time of arrival being appended with an identifier of the associated positioning cell;
 processing the times of arrival and using known positions of the positioning cells to determine a position of communication device with respect to the positioning cells; and
 sending to the communication device second data indicative of the position.

2. The system of claim 1, wherein the positioning cells are associated with respective physical cell identifications (PCIs) but do not have global cell identifications in the cellular network.

3. The system of claim 1, wherein the positioning signals do not interfere with the cellular network, the positioning signals comprising at least one of:
 first positioning signals orthogonal to the synchronization signals of the cellular network in a time domain;
 second positioning signals orthogonal to the synchronization signals of the cellular network in a frequency domain;
 third positioning signals transmitted during gaps in which nearby macro-cells of the cellular network do not transmit synchronization, the third positioning signals having a transmission power lower than a threshold power, so as not to overwhelm the synchronization signals transmitted by farther macro-cells.

4. The system of claim 1, wherein prior to the receiving of the synchronization signal, the positioning cells are configured for performing an analysis of the cellular network, and synchronizing with the cellular network based on the analysis, in order to turn on respective reception antennas at every cycle for respective time intervals within which the cellular synchronization signal is expected to arrive at the respective positioning cells.

5. The system of claim 1, wherein the positioning cells are configured for initially connecting to the communication device in a manner that does not use the cellular network, receive information relating to cellular network from the communication device, and only then listening to the cellular network according to the received information relating to cellular network.

6. The system of claim 1, wherein any given positioning cell is configured for:
 listening to at least one previous positioning cell;
 determining the time difference between the time of arrival of the positioning signal emitted by the previous positioning cell and a theoretical time of arrival that would occur if the positioning signal emitted by the previous positioning cell took a shortest path from the previous positioning cell to the given positioning cell; and
 emitting a respective positioning signal at a time interval following reception of the previous positioning cell's positioning signal, the time interval being equal to a predetermined delay minus the time difference.

7. The system of claim 6, wherein the any given positioning cell is in line on sight with the previous positioning cell.

8. The system of claim 1, wherein:
a plurality of first positioning cells are configured for receiving at least some second positioning signals emitted by at least some second positioning cells, the first positioning cells belonging to a same first group or to a plurality of distinct first groups;
the first positioning cells are configured for creating a plurality of respective maps of time differences between the times of arrival of the second positioning signals and respective theoretical times of arrival that would occur if the second positioning cells were synchronized with the first positioning cells;
the first positioning cells are configured for transmitting data indicative of the respective maps to the at least some second positioning cells by wire or wirelessly;
each of the second positioning cells is configured for receiving the plurality of maps, and for extracting therefrom respective data relating to time differences associated with the second positioning signal emitted by the second positioning cell relative to the plurality of first positioning cells;
each of the second positioning cells is configured for processing the data extracted from the plurality of maps to determine a respective adjustment in a respective timing of emission of the specific positioning signal, in order to synchronize with the plurality of first positioning cells in a present cycle or in a subsequent cycle.

9. The system of claim 8, wherein:
the map comprises information relating to qualities of the positioning signals emitted by at least some of the second positioning cells; and
each of the second positioning cells is configured for determining the respective adjustment by calculating a weighted average of time differences relative to the plurality of first positioning cells, each weight applied to a time difference being a measure of a quality of the positioning signal associated with the time difference.

10. The system of claim 8, wherein each of the first positioning cells is configured for receiving the at least some second positioning signals emitted by the at least some second positioning cells which do not belong a group of the first positioning cell.

11. The system of claim 8, wherein any one group consists of a single positioning cell or of two or more positioning cells.

12. The system of claim 8, wherein:
all the positioning cells in the system form a single group;
each positioning cell comprises a respective antenna system configured for emitting the respective positioning signal while listening to positioning signals emitted by at least some other positioning cells.

13. The system of claim 1, wherein:
(i) the first positioning cell is a master cell connected to AC power and synchronized with the cellular network, the master cell being configured for emitting a beacon at every cycle in response to a reception of each cycle's synchronization signal;
(ii) a plurality of second positioning cells are slave cells, configured for:
turning on for a predetermined time length at every cycle in order to listen for the beacon;
receiving the beacon; and
emitting second positioning signals at a predetermined time period following reception of the beacon, such that the second positioning signals are received by the communication device shortly after the communication device receives the synchronization signal, while the communication device still listens;
(iii) the master cell is configured for receiving the slave positioning signals and compiling a map of time differences between the times of arrival of the slave positioning signals and respective theoretical times of arrival that would occur if the slave cells were synchronized with the first master cells;
(iv) the master cell is configured for sending data indicative of the map to the slave cells;
(v) each slave cell is configured for extracting from the data indicative of the map respective information indicative of a respective adjustment in timing of emission of the respective slave positioning signal for a subsequent cycle;
(vi) in the subsequent cycle, each slave cell is configured for adjusting the time of emission and for adjusting a beginning and end of the predetermined time length.

14. The system of claim 13 wherein the master positioning cell is in line of sight with all the slave positioning cells.

15. The system of claim 13, comprising a plurality of master positioning cells, and a plurality of slave positioning cells wherein:
the master positioning cells are configured for synchronizing with each other and to the cellular network;
following the synchronization, the master positioning cells are configured for emitting respective beacons at each cycle;
each of the slave positioning cells is configured for:
receiving the plurality of beacons, calculating theoretical times of arrival of the beacons by using respective known distances of the slave positioning cell from the master positioning cells;
calculating a plurality of differences, each difference being a difference between the theoretical time of arrival associated with a respective master and a time of arrival of the respective master's beacon;
selecting the smallest difference; and
emitting a slave positioning signal at a predetermined time following the time of arrival of the beacon associated with the smallest difference.

16. The system of claim 15, wherein the plurality of master positioning cells are in line of sight with each other.

17. The system of claim 1, further comprising the server.

18. The system of claim 1, further comprising a central control unit connected to the positioning cells and to the server, and configured for coordinating an operation between positioning cells and transfer of data between the positioning cells and the server.

19. A positioning system configured for being used in conjunction with a server and a communication device synchronized with a cellular network, the positioning system comprising:
a plurality of positioning cells, each positioning cell comprising an antenna unit configured for emitting and receiving radio-frequency signals, and being associated with a non-volatile memory unit configured for storing data, a processing unit configured for processing data and for controlling an operation of the antenna unit, and a power source configured for powering the antenna unit;

wherein:
at least one of the positioning cells is connected to a cellular network, and the positioning cells are configured for emitting respective positioning signals receivable by the communication device in a frequency used by the cellular network, in response to the reception of a synchronization signal emitted by the cellular network, each positioning signal comprising data indicative of an identifier of the positioning cell that emitted the positioning signal;

wherein the positioning cells are set in groups;

the positioning cells belonging to any same group are configured for emitting the respective positioning signals at the same time;

each group of positioning cells is configured for emitting the respective positioning signals in quick succession at respective times following the synchronization signal;

at least one first positioning cell of any given group is configured for listening to at least one second positioning signal emitted by at least one second positioning cell;

the at least one first positioning cell is configured for determining a time difference between the time of arrival of the second positioning signal at the first positioning cell and a respective theoretical time of arrival that would occur if the at least one second positioning cell were synchronized with the at least one first positioning cell;

the at least one first positioning cell is configured for transmitting data indicative of the difference to the at least one second positioning cell by wire or wirelessly;

the at least one second positioning cell is configured to adjust a timing of emission of the second positioning signal according to the difference, in order to synchronize with the at least one first positioning cell; and the server is in communication with the communication device, the server being configured for:
receiving from the communication device first data indicative of times of arrival of the positioning signals to the communication device, each piece of data indicative of a time of arrival being appended with an identifier of the associated positioning cell;

processing the times of arrival and using known positions of the positioning cells to determine a position of communication device with respect to the positioning cells; and sending to the communication device second data indicative of the position.

* * * * *